Patented Feb. 12, 1935

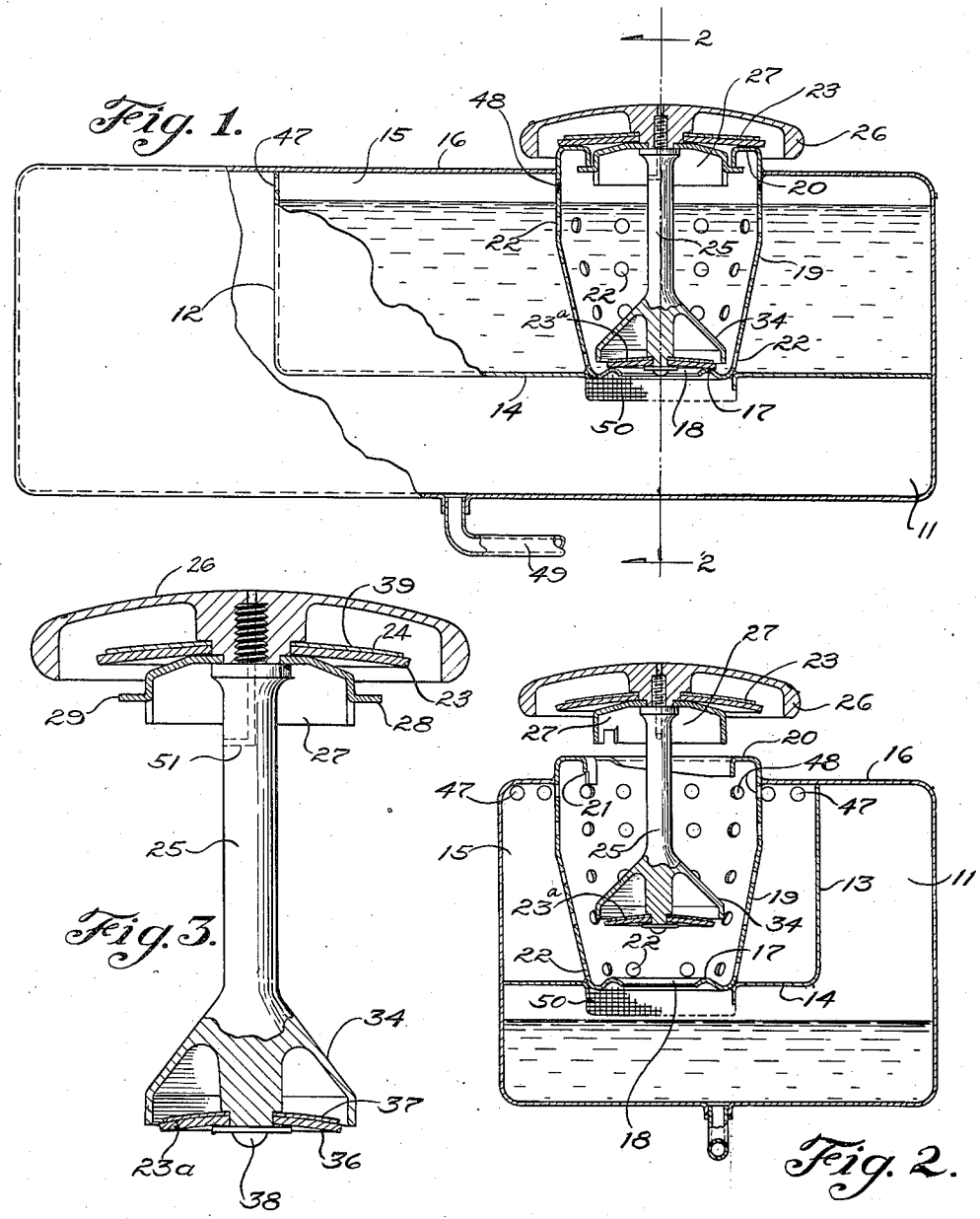

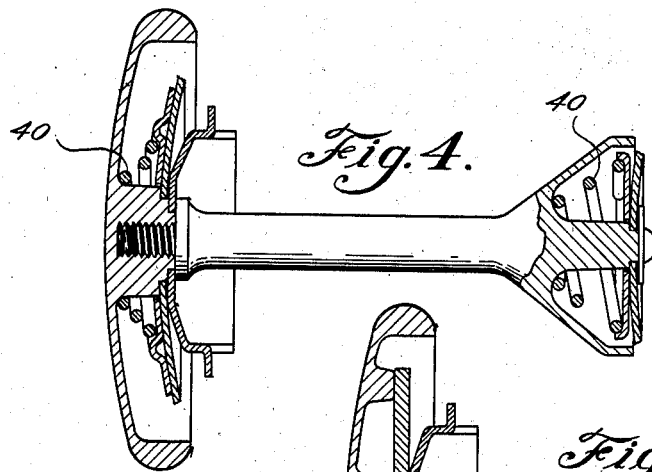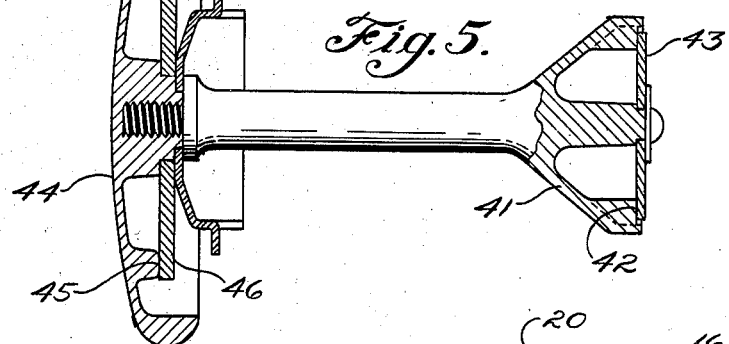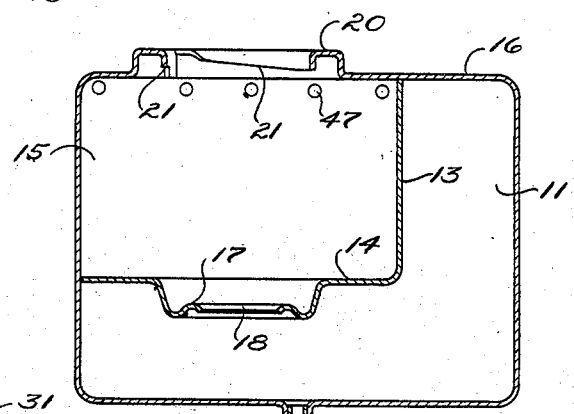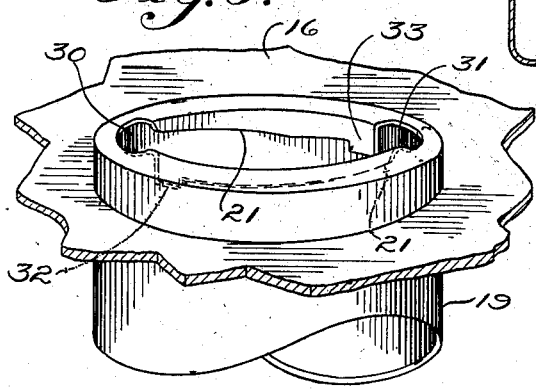

1,990,604

UNITED STATES PATENT OFFICE 1,990,604

RESERVE TANK CONTROL

Glen A. Johnson, Connersville, Ind., assignor to Kyle E. Stant and Ivan H. Stant, Connersville, Ind.

Application November 18, 1931, Serial No. 575,778

11 Claims. (Cl. 158—46.5)

This invention relates especially to that class of device or apparatus which warns the operator of an internal combustion engine that the supply of fuel for the engine is running low or has become exhausted, and, pending a replenishment of this supply, renders a supply, which has been held in reserve, available so that the engine may be operated for a sufficient period of time to enable the operator to have the main supply replenished.

Many devices of this general type have been invented, but, in each of these devices the act of conditioning the parts, both to fill the main and reserve supply as well as to render the reserve supply available after the main supply has become exhausted, necessitate two or more operations, each independent of the other. However, the invention herein described, has for an object the simplification of devices of this type so that they not only contain fewer parts, but also so that they may be operated with materially fewer manipulations which are more naturally performed than those of devices of a more complicated nature.

In previous liquid reserve supply devices as disclosed in the art, the liquid reserve chamber once filled, remains unused until an emergency arises. In such devices, the reserve liquid can remain in the reserve chamber for a great length of time and thereby lose a portion of its original strength or its physical properties can change to the extent that it may not be usable in an emergency. In my construction it is obvious that each time liquid is introduced into the main tank, any liquid that may be stored in the reserve tank is automatically emptied and a fresh supply substituted therefor.

Another object of this invention is the self contained valve mechanism which can be instantly removed for examination and repair.

These and other objects are attained in the reserve liquid supply device described in the following specification and illustrated in the accompanying drawings, in which:

Fig. 1 is a side sectional view of a tank equipped with my improved reserve supply device and constructed for cooperation therewith, the device being shown in closed condition.

Fig. 2 is a view transversely of the tank as shown in Fig. 1, taken on the line 2—2 thereof, and showing the supply device in opened condition.

Fig. 3 is an enlarged sectional view of one form of the movable portion or stopper of the supply device embodying my invention.

Fig. 4 is a sectional view of another form of the movable portion or stopper of the supply device embodying my invention.

Fig. 5 is a sectional view of still another form of the movable portion or stopper of the supply device embodying my invention.

Fig. 6 is a top view of a tank as shown in Fig. 1, showing open end of filling tube with locking cams for locking stopper in closed position.

Fig. 7 is a side sectional view of a tank showing another variation in construction.

In the embodiment of my reserve supply device I provide a main tank 11 with internal walls 12 and 13, as well as an inner bottom 14, such walls and bottom being spaced from the walls of the main tank 11 to enclose a materially smaller space forming a tank 15 enclosing the reserve supply.

The opening to both the main and reserve supply tanks is through the top wall 16 which is common to both tanks. In the bottom 14 of the reserve tank, is an outlet opening provided with an annular valve seat 17 which makes of the opening a port 18 through which the tank 11 receives its main as well as reserve supply. Connecting the opening in the top 16 with the port in the bottom 14 is a tube 19 which is provided at its top with an inturned flange forming a valve seat 20 and on its depending inner edge with inclined locking faces 21 by means of which the filler cap is secured, as will be explained. Tube 19 at its lower end, above seat 17 and communicating with the interior of reserve tank 15 close to its bottom, is provided with a series of openings 22 which permit of filling and emptying the reserve tank as will be explained.

We now come to a general description of the filler top and valve mechanism comprising the stopper, by means of which control of both filling and emptying functions of both main and reserve tanks are obtained. First of all I call attention to the presence of the two valve seats located at opposite ends of the tube 19, as has been explained. These respective seats 17 and 20 are closed by respective valves 23a and 23 which are carried in spaced relation on a stem 25 on the upper end of which a cap 26 is mounted for manipulation of the valves as well as to afford an ornamental covering for the upper end of tube 19. As a means for closing the valves tightly upon the seats, I have provided a locking member 27 which is located on the stem 25 adjacent the valve 23 and has lugs 28 and 29 extending therefrom for engagement with the inclined locking faces 21. To permit the stopper comprising the valve stem and the valves carried thereby, to be lifted and removed from the seats and tube 19, for the purpose of filling the tanks, I have notched the depending inner flange at the top of the tube, at points of least inclination of the locking faces 21, as shown at 30 and 31 on Fig. 6, thereby permitting lugs 28 and 29 to pass in lifting the stopper from the tube 19. To prevent the stopper being turned too far in its locking movement, I have provided stops 32 and 33 as end extensions on the inclined flanges 21, against which the stopper lugs 28 and 29 engage when the stopper has been moved to fully sealed position.

In Figs. 3, 4 and 5 specific stopper constructions are shown. The stopper of Fig. 3 is a desirable form of stopper. The two valves 23a and 23 of this construction, as well as those shown in Figs. 4 and 5, are protected from damage in manipulation by equipping the stem 25 with a bell shaped shield 34 at its lower end and by having the cap 35 act as the shield at its upper end. The valves in the stopper construction are of yielding, resilient or spring type so that closure of the tanks is effective and also that the stopper may be held in stopped position when in place as shown in Fig. 1. In this instance, each valve is of the same construction. Valve 23a consists of a gasket 36 which is backed by a resilient spring metal disk 37 and is held for free movement on stem 25 by a screw 38. Valve 23 is mounted on a shoulder of cap 35, for free movement between it and locking member 27, and consists of a gasket 24 backed by a resilient metal disk 39. Fig. 4 is a construction similar to that just described, but, in lieu of the resilient disks of Fig. 3, I have provided for inherently rigid disks and have allowed for axial movement of the rigid metal disks on the stem, with a backing consisting of the coil springs 40 and 40a. In Fig. 5 is shown a stopper providing no resilient mounting of either valve. In lieu of this, the shield 41 has been provided with a seat 42 to support the pressure of seat 17 against the gasket 43, while cap 44 is provided with a seat 45 to support the pressure of seat 20 against gasket 46.

It is common practice to vent fuel tanks either through the top of the tank wall or through the filler cap, to avoid a vacuum being created as the liquid contents leave the tank. If a vacuum were created, obviously it would prevent the flow of the liquid. Through the cap 35 and the stem 25 is a vent hole 51 communicating with the space inside the tank and the exterior.

The tube 19 is not necessary to the proper operation of the closure valves but is used to give a simple and accurate means of assembly in manufacture. The omission of the tube as shown by Fig. 6 does not prevent the device from functioning as described.

Depending from the opening 18 is shown a screen guard 50 which completely encloses and extends across the said opening. This screen guard avoids theft of liquid from the main tank by preventing the insertion of a siphon tube.

The operating of filling both main and reserve supply tanks as well as of controlling the delivery of the reserve supply when the main supply has become exhausted, now will be described. In filling the tanks the stopper is first removed. This allows access of the liquid to tank 11 through port 18 and to tank 15 through openings 22 in tube 19. As liquid is poured into the tube through its upper end opening, the level gradually rises. In order that the air in tank 11 be not trapped, I have provided a small vent or series of vents 47 in one or more of the walls 12 and 13 near the top of the tank, while in tube 19 I have provided similar vents 48 near the top, to allow the air in both tanks to escape. When the tanks thus have been filled, the stopper is replaced within the tube 19, the lugs 28 and 29 of the stopper being allowed to pass through the notches 30 and 31, whereby, when the stopper is rotated, these lugs will ride over the inclined locking faces 21 and thus operate to force the stopper downwardly to cause its valves 23 and 23a to engage the respective seats 17 and 20 to close the port 18 and opening in the top of the filler tube 19. As liquid is used from main tank 11 through outlet 49, this tank may become completely emptied of said liquid, as shown in Fig. 1, without in any way having to draw upon the contents of reserve tank 12. Naturally, the user of the liquid becomes aware of the emptying of the tank 11 when the mechanism depending thereon, ceases operation. However, there is no need to suffer serious inconvenience because of this occurrence, because of the reserve supply in tank 12. To render this supply available in such emergencies, it is but necessary to release the stopper to allow it to be lifted to the position shown in Fig. 2, wherein the contents of tank 12 will flow through tube openings 22 and port 18, into tank 11, thereby placing the entire reserve supply into communication with outlet 49, whereby maintenance of service from the reserve supply may be maintained until such time as a fresh supply is available to refill both tanks.

I desire to comprehend within my invention such modifications as may be clearly embraced within my claims and the scope of my invention.

Having thus fully described my invention, what I claim as new and desire to secure by Letters Patent, is:

1. A reserve liquid supply device comprising, in combination, a main supply tank and a reserve supply tank, said tanks having an opening between them placing them in communication, one of said tanks having an exterior opening permitting access to both tanks for filling purposes, closure means to close the communicating opening and the exterior opening, and means rendering said closure means operable only simultaneously.

2. A reserve liquid supply device comprising, in combination, a main supply tank and a reserve supply compartment within the main supply tank, said tank and compartment having an exterior filler opening in common and a separate opening in the reserve compartment communicating with the main tank, closure means for both openings and means rendering said closure means operable only simultaneously.

3. A reserve liquid supply device comprising, in combination, a main supply tank and a reserve supply tank, a tube connecting the tanks, said tube open at one end into the main supply tank and open at the opposite end exterior the tanks for filling said tanks, said tube having an opening between said ends providing communication with the reserve supply tank, a valve closing the first mentioned end of the tube, a separate valve closing the second mentioned end of the tube, and means functioning to open and close both valves simultaneously.

4. A reserve liquid supply device comprising, in combination with a main supply tank and a reserve supply tank, a tube connecting the tanks, said tube open at one end into the main supply tank and open at the opposite end exterior the tanks for filling said tanks, said tube having communication between its ends with the reserve supply tank and means for opening and closing both ends of the tube simultaneously.

5. A reserve liquid supply device comprising, in combination with a main supply tank and a reserve supply tank, a tube connecting the tanks, said tube having discharge openings therein communicating with both tanks and a separate opening to receive liquid for the filling of the tanks, a stopper to close the filling opening in the tube and the discharge opening of the tube to one of the tanks simultaneously, whereby opening of the filling opening will open the closed tank to permit transfer of its contents to the other tank.

6. A reserve liquid supply device comprising, in combination, a main supply tank and a reserve supply tank, a tube placing the interiors of the tanks in communication with each other and open at one end to permit entrance of liquid to both tanks, and a stopper for the tube, said stopper closing the tube entrance and closing communication between the tanks, whereby the main tank may be emptied independently of the reserve tank and then the reserve tank allowed to empty through the tube into the main tank upon opening movement of the stopper.

7. A reserve liquid supply device comprising, a main supply tank and a reserve supply tank therein, said reserve tank having a lower opening therein placing the interiors of the tanks in communication with each other, said tanks having a common filler opening therein, said openings being located in spaced relationship with each other on a common axis, valves for closing said openings, whereby the main tank may be emptied independently of the reserve tank and the reserve tank allowed to empty through its lower opening into the main tank upon the elevation of both valves from their respective seats and means extending between said valves for simultaneous movement thereof.

8. A reserve liquid supply device comprising, in combination, a main supply tank and a reserve supply tank therein, said main tank having a filler opening therein exterior of the tanks, said reserve tank having an opening therein placing the interiors of the tanks in communication with each other, sealing means for the two openings, means extending between the sealing means whereby the openings are simultaneously sealed or unsealed, and guide means to position said sealing means relatively to the openings.

9. A reserve liquid supply device comprising, in combination, a main supply tank and a reserve supply tank, a tube with perforated side walls connecting the tanks, said tube being open at both ends one end of the tube extending into the main supply tank and the opposite end extending exterior the tanks, for filling said tanks the perforations of the side walls providing communication in between said ends with the reserve supply tank, a valve closing the first mentioned end of the tube, a separate valve closing the second mentioned end of the tube, and means functioning to open and close both valves simultaneously.

10. A reserve liquid supply device comprising, in combination, a main supply tank, a partition interior the main tank forming a reserve compartment therein, an opening in the partition providing communication between the main tank and the reserve compartment, a filler opening into the main tank a closure associated with each of said openings and means, extending between the closures, whereby said closures close said openings approximately simultaneously.

11. In a reserve supply device, two tanks, one of said tanks having a filling opening, a second opening below said filling opening in the same tank means including said second opening providing inter-communication between said tanks, closure means for the openings, and means extending between said closure means whereby closing of said openings by said closure means is controlled approximately simultaneously.

GLEN A. JOHNSON.